(12) United States Patent
Kasai et al.

(10) Patent No.: US 11,814,709 B2
(45) Date of Patent: Nov. 14, 2023

(54) STEEL FOR NITROCARBURIZING AND NITROCARBURIZED COMPONENT, AND METHODS OF PRODUCING SAME

(71) Applicant: JFE STEEL CORPORATION, Tokyo (JP)

(72) Inventors: Masayuki Kasai, Tokyo (JP); Naoya Ihara, Tokyo (JP); Kimihiro Nishimura, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 191 days.

(21) Appl. No.: 17/286,876

(22) PCT Filed: Oct. 28, 2019

(86) PCT No.: PCT/JP2019/042174
§ 371 (c)(1),
(2) Date: Apr. 20, 2021

(87) PCT Pub. No.: WO2020/090739
PCT Pub. Date: May 7, 2020

(65) Prior Publication Data
US 2021/0381088 A1    Dec. 9, 2021

(30) Foreign Application Priority Data

Oct. 31, 2018   (JP) .................. 2018-206107

(51) Int. Cl.
*C22C 38/60* (2006.01)
*C22C 38/44* (2006.01)
(Continued)

(52) U.S. Cl.
CPC ............... *C22C 38/60* (2013.01); *C21D 7/13* (2013.01); *C21D 8/005* (2013.01); *C21D 9/00* (2013.01);
(Continued)

(58) Field of Classification Search
CPC ...... C21D 1/06; C21D 1/26; C21D 2211/002; C21D 6/002; C21D 6/005; C21D 7/13;
(Continued)

(56) References Cited

U.S. PATENT DOCUMENTS 9,718,256 B2    8/2017   Gyotoku et al.
9,994,944 B2    6/2018   Hideki et al.
(Continued)

FOREIGN PATENT DOCUMENTS

CN    103180476 A    6/2013
CN    104220620 A    12/2014
(Continued)

OTHER PUBLICATIONS

Jan. 21, 2020, International Search Report issued in the International Patent Application No. PCT/JP2019/042174.
(Continued)

*Primary Examiner* — Jenny R Wu
(74) *Attorney, Agent, or Firm* — KENJA IP LAW PC (57) ABSTRACT

Provided is a steel for nitrocarburizing that ensures mechanical workability before nitrocarburizing treatment. A steel for nitrocarburizing comprises: a chemical composition containing, in mass %, C: ≥0.02% and <0.15%, Si: ≤0.30%, Mn: 1.5-2.5%, P: ≤0.025%, S: ≤0.06%, Cr: 0.5-2.0%, Mo: 0.005-0.2%, V: 0.02-0.20%, Nb: 0.003-0.20%, Al: >0.020% and ≤1.0%, Ti: >0.0050% and ≤0.015%, N: ≤0.0200%, Sb: 0.0030-0.010%, with a balance being Fe and inevitable impurities, satisfying Expression (1) or (2); and a steel microstructure where an area ratio of bainite phase is >50%, a prior austenite grain size is ≤100 μm, ≥300/μm² Ti precipitates with an equivalent circular particle size of ≤30 nm disperse, Sb segregates to prior austenite grain boundaries.

4 Claims, 2 Drawing Sheets

(51) Int. Cl.
  *C22C 38/46* (2006.01)
  *C22C 38/48* (2006.01)
  *C22C 38/50* (2006.01)
  *C22C 38/42* (2006.01)
  *C22C 38/54* (2006.01)
  *C22C 38/00* (2006.01)
  *C22C 38/06* (2006.01)
  *C22C 38/52* (2006.01)
  *C23C 12/00* (2006.01)
  *C21D 9/00* (2006.01)
  *C21D 8/00* (2006.01)
  *C21D 7/13* (2006.01)

(52) U.S. Cl.
  CPC .......... *C22C 38/001* (2013.01); *C22C 38/002* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *C23C 12/00* (2013.01); *C21D 2211/002* (2013.01)

(58) Field of Classification Search
  CPC . C21D 8/00; C21D 8/005; C21D 9/00; C21D 9/32; C22C 38/001; C22C 38/002; C22C 38/06; C22C 38/22; C22C 38/24; C22C 38/26; C22C 38/28; C22C 38/38; C22C 38/42; C22C 38/44; C22C 38/46; C22C 38/48; C22C 38/50; C22C 38/52; C22C 38/54; C22C 38/60; C23C 12/00; Y02P 10/25
  See application file for complete search history.

(56) References Cited

U.S. PATENT DOCUMENTS

| | | |
|---|---|---|
| 10,125,416 B2 | 11/2018 | Omori et al. |
| 2018/0105919 A1 | 4/2018 | Kasai et al. |
| 2020/0149148 A1 | 5/2020 | Ihara et al. |

FOREIGN PATENT DOCUMENTS

| | | |
|---|---|---|
| CN | 107406942 A | 11/2017 |
| EP | 2520682 A1 | 11/2012 |
| EP | 3276023 A1 | 1/2018 |
| EP | 3279356 A1 | 2/2018 |
| JP | H0559488 A | 3/1993 |
| JP | 2001303174 A | 10/2001 |
| JP | 2002069572 A | 3/2002 |
| JP | 2010163671 A | 7/2010 |
| JP | 2011122208 A | 6/2011 |
| JP | 2013166997 A | 8/2013 |
| JP | 2013194301 A | 9/2013 |
| JP | 5567747 B2 | 8/2014 |
| JP | 2016056450 A | 4/2016 |
| WO | 2016152167 A1 | 9/2016 |
| WO | 2018101451 A1 | 6/2018 |

OTHER PUBLICATIONS

Jun. 28, 2021, the Extended European Search Report issued by the European Patent Office in the corresponding European Patent Application No. 19878050.4.

May 23, 2022, Office Action issued by the China National Intellectual Property Administration in the corresponding Chinese Patent Application No. 201980071014.3 with English language search report.

STEEL FOR NITROCARBURIZING AND NITROCARBURIZED COMPONENT, AND METHODS OF PRODUCING SAME

TECHNICAL FIELD

The present disclosure relates to a steel for nitrocarburizing and a nitrocarburized component using the steel for nitrocarburizing, and methods of producing the same. The present disclosure particularly relates to a steel for nitrocarburizing that has excellent hot forgeability and excellent fatigue resistance after nitrocarburizing treatment, has little heat treatment distortion in the nitrocarburizing treatment, and is suitable for components of vehicles or construction machines.

BACKGROUND

Machine structural components such as automobile gears are required to have excellent fatigue resistance. For this, surface hardening treatment is usually performed. As such surface hardening treatment, carburizing treatment, induction hardening treatment, nitriding treatment, and the like are well known.

Carburizing treatment is a process of infiltrating and diffusing C in a high-temperature austenite region, so that deep hardened case depth is obtained. Carburizing treatment is thus effective in improving fatigue strength. However, since carburizing treatment causes heat treatment distortion, it is difficult to apply carburizing treatment to components that, from the perspective of noise and the like, require high dimensional accuracy.

Induction hardening treatment is a process of quenching the surface layer by high frequency induction heating, which causes heat treatment distortion, too. A component after induction hardening treatment therefore has poor dimensional accuracy, as in carburizing treatment.

Nitriding treatment is a process of infiltrating and diffusing nitrogen in a relatively low temperature range not higher than $Ac_1$ transformation temperature, to increase surface hardness. Such nitriding treatment is considered to cause little heat treatment distortion mentioned above. However, nitriding treatment takes a long treatment time of 50 hr to 100 hr, and requires removal of a brittle compound layer in the surface layer after the treatment.

In view of this, nitrocarburizing treatment with approximately the same treatment temperature as and shorter treatment time than nitriding treatment has been developed and widely used for machine structural components and the like in recent years. Nitrocarburizing treatment is a process of infiltrating and diffusing nitrogen (N) and carbon (C) simultaneously in a temperature range of 500° C. to 600° C. to harden the surface, and can reduce the treatment time by more than half as compared with the conventional nitriding treatment.

However, while carburizing treatment can increase the core hardness of the component by quench hardening, the core hardness does not increase with nitrocarburizing treatment because the treatment is performed at a temperature of not higher than the transformation temperature of steel. This causes lower fatigue resistance of a nitrocarburized material than a carburized material.

To enhance the fatigue strength of a nitrocarburized material, quenching-tempering treatment is typically performed before nitrocarburizing treatment to increase the core hardness. The resultant fatigue strength is, however, insufficient. Besides, the production costs increase, and the mechanical workability decreases.

A technique of adding a carbonitride forming element in nitrocarburizing treatment to improve fatigue strength has also been developed. However, since the element diffuses with the precipitation of carbonitrides, the crystal lattice needs to be rearranged. Hence, not a little heat treatment distortion occurs, and the component accuracy decreases.

To solve these two problems with fatigue strength and heat treatment distortion, JP H5-59488 A (PTL 1) proposes a steel for nitrocarburizing that contains Ni, Al, Cr, Ti, and the like to achieve high bending fatigue strength after nitrocarburizing treatment.

By subjecting the steel to nitrocarburizing treatment, the core is age-hardened by Ni—Al and Ni—Ti intermetallic compounds or Cu compounds, and the surface layer is hardened by precipitating nitrides or carbides of Cr, Al, Ti, and the like in the nitrided case, thus improving bending fatigue strength.

JP 2002-69572 A (PTL 2) proposes a steel for nitrocarburizing that contains 0.5% to 2% Cu and is extend-forged by hot forging and then air-cooled to form a microstructure mainly composed of ferrite in which Cu is dissolved. Subsequently, nitrocarburizing treatment at 580° C. for 120 min causes precipitation hardening by Cu and also precipitation hardening by Ti, V, and Nb carbonitrides, to achieve excellent bending fatigue resistance after the nitrocarburizing treatment.

JP 2010-163671 A (PTL 3) proposes a steel for nitrocarburizing in which Ti—Mo carbides and carbides containing these elements and further containing one or more of Nb, V, and W are dispersed.

JP 2013-166997 A (PTL 4) proposes a steel material for nitriding that contains V and Nb and whose microstructure before nitriding is mainly composed of bainite so that the precipitation of V and Nb carbonitrides is suppressed before nitriding and induced during the nitriding, thus achieving excellent fatigue strength with improved core hardness.

CITATION LIST

Patent Literatures

PTL 1: JP H5-59488 A
PTL 2: JP 2002-69572 A
PTL 3: JP 2010-163671 A
PTL 4: JP 2013-166997 A
PTL 5: JP 5567747 B2

SUMMARY

Technical Problem

The steel for nitrocarburizing described in PTL 1 improves the bending fatigue strength by precipitation hardening by Ni—Al and Ni—Ti intermetallic compounds, Cu, and the like, but does not ensure sufficient workability. Moreover, since the steel contains a large amount of Ni, the production costs increase.

In addition, large heat treatment distortion occurs with the formation of intermetallic compound phase as mentioned above, as a result of which the component accuracy decreases.

The steel for nitrocarburizing described in PTL 2 requires high production costs, because Cu, Ti, V, and Nb need to be added in relatively large amounts. Moreover, since the steel contains a lot of alloying elements, heat treatment distortion due to nitrocarburizing is significant.

The steel for nitrocarburizing described in PTL 3 is also costly, because it contains Ti and Mo in relatively large amounts. In addition, heat treatment distortion is significant.

The steel material for nitriding described in each of PTL 4 and PTL 5 suppresses an increase in bainite hardness by reducing C, in order to ensure machinability by cutting. Reducing C causes a decrease in hardenability, and makes it difficult to form bainite microstructure. To compensate for this, Mn, Cr, and Mo effective in hardenability improvement are added to promote the formation of bainite microstructure. However, when producing a rolling material by continuous casting, defects called continuous casting cracks tend to occur on the cast steel surface. This decreases productivity.

It could therefore be helpful to provide a steel for nitrocarburizing that ensures fatigue resistance without being hardened before nitrocarburizing treatment, suffers no heat treatment distortion in the nitrocarburizing treatment, and has excellent mechanical workability before the nitrocarburizing treatment, together with a method of producing the same. It could also be helpful to provide a nitrocarburized component that has improved fatigue resistance as a result of enhancing the surface hardness by nitrocarburizing treatment after machining and has high dimensional accuracy as a result of reducing heat treatment distortion in the nitrocarburizing treatment, together with a method of producing the same.

Solution to Problem

Through intensive study on the influences of the chemical composition and microstructure of steel for nitrocarburizing, we discovered the following: Steel that has a chemical composition containing appropriate amounts of V and Nb and a microstructure including bainite phase in an area ratio of more than 50% ensures excellent mechanical workability, while the contents of relatively expensive elements such as Ti and Cu are reduced. Moreover, in a nitrocarburized component obtained as a result of nitrocarburizing treatment on the steel, fine precipitates containing V and Nb are dispersion-precipitated in the core to increase the core hardness. Further, by combined addition of Ti and Sb in respective appropriate amounts, Ti carbonitrides are appropriately distributed, as a result of which heat treatment distortion in nitrocarburizing can be minimized.

The present disclosure is based on these discoveries and further studies.

We thus provide:

1. A steel for nitrocarburizing, comprising: a chemical composition containing (consisting of), in mass %, C: 0.02% or more and less than 0.15%, Si: 0.30% or less, Mn: 1.5% or more and 2.5% or less, P: 0.025% or less, S: 0.06% or less, Cr: 0.5% or more and 2.0% or less, Mo: 0.005% or more and 0.2% or less, V: 0.02% or more and 0.20% or less, Nb: 0.003% or more and 0.20% or less, Al: more than 0.020% and 1.0% or less, Ti: more than 0.0050% and 0.015% or less, N: 0.0200% or less, and Sb: 0.0030% or more and 0.010% or less, with a balance being Fe and inevitable impurities, satisfying any of the following Expressions (1) and (2):

in the case where the C content is 0.02% or more and 0.10% or less, $$1.4 \leq A \leq 3.2 \quad (1)$$

where $A=1000 \times \{7 \times (Ti/48) + 17 \times (Sb/122)\}$; and in the case where the C content is more than 0.10% and less than 0.15%, $$0.9 \leq A \leq 2.3 \quad (2)$$

where $A=850 \times \{5 \times (Ti/48) + 13 \times (Sb/122)\}$;

and a steel microstructure in which an area ratio of bainite phase is more than 50%, a prior austenite grain size is 100 μm or less, 300 or more Ti precipitates with an equivalent circular particle size of 30 nm or less disperse per μm², and Sb segregates to prior austenite grain boundaries.

2. The steel for nitrocarburizing according to 1., wherein the chemical composition further contains, in mass %, one or more selected from the group consisting of B: 0.010% or less, Cu: 0.30% or less, and Ni: 0.30% or less.

3. The steel for nitrocarburizing according to 1. or 2., wherein the chemical composition further contains, in mass %, one or more selected from the group consisting of Co: 0.2% or less, Zr: 0.2% or less, Hf: 0.3% or less, Ta: 0.3% or less, and W: 0.4% or less.

4. The steel for nitrocarburizing according to any of 1., 2., and 3., wherein the chemical composition further contains, in mass %, one or more selected from the group consisting of Pb: 0.2% or less, Bi: 0.2% or less, Zn: 0.3% or less, and Sn: 0.3% or less.

5. A component, comprising: a core having the chemical composition and the steel microstructure according to any of 1. to 4.; and a surface layer having a chemical composition in which contents of nitrogen and carbon are higher than in the chemical composition of the core.

6. The component according to 5., comprising precipitates containing at least one of V and Nb, in the bainite phase.

7. A method of producing a steel for nitrocarburizing, the method comprising: subjecting a steel material to first hot working of working at a heating temperature of 1200° C. or more and then cooling to 400° C. or less at a cooling rate in a temperature range of 650° C. to 400° C. of 0.2° C./s or more: and thereafter subjecting the steel material to second hot working of working at a heating temperature of 1200° C. or more and then cooling at a cooling rate in a temperature range of 700° C. to 550° C. of 0.4° C./s or more, wherein the steel material has a chemical composition containing (consisting of), in mass %, C: 0.02% or more and less than 0.15%, Si: 0.30% or less, Mn: 1.5% or more and 2.5% or less, P: 0.025% or less, S: 0.06% or less, Cr: 0.5% or more and 2.0% or less, Mo: 0.005% or more and 0.2% or less, V: 0.02% or more and 0.20% or less, Nb: 0.003% or more and 0.20% or less, Al: more than 0.020% and 1.0% or less, Ti: more than 0.0050% and 0.015% or less, N: 0.0200% or less, and Sb: 0.0030% or more and 0.010% or less, with a balance being Fe and inevitable impurities, satisfying any of the following Expressions (1) and (2):

in the case where the C content is 0.02% or more and 0.10% or less, $$1.4 \leq A \leq 3.2 \quad (1)$$

where $A=1000 \times \{7 \times (Ti/48) + 17 \times (Sb/122)\}$; and in the case where the C content is more than 0.10% and less than 0.15%, $$0.9 \leq A \leq 2.3 \quad (2)$$

where $A=850 \times \{5 \times (Ti/48) + 13 \times (Sb/122)\}$.

8. The method of producing a steel for nitrocarburizing according to 7., wherein the chemical composition further contains, in mass %, one or more selected from the group consisting of B: 0.010% or less, Cu: 0.30% or less, and Ni: 0.30% or less.

9. The method of producing a steel for nitrocarburizing according to 7. or 8., wherein the chemical composition further contains, in mass %, one or more selected from the group consisting of Co: 0.2% or less, Zr: 0.2% or less, Hf: 0.3% or less, Ta: 0.3% or less, and W: 0.4% or less.

10. The method of producing a steel for nitrocarburizing according to any of 7., 8., and 9., wherein the chemical composition further contains, in mass %, one or more selected from the group consisting of Pb: 0.2% or less, Bi: 0.2% or less, Zn: 0.3% or less, and Sn: 0.3% or less.

11. A method of producing a nitrocarburized component, the method comprising subjecting a steel for nitrocarburizing obtained by the method according to any of 7. to 10., to nitrocarburizing treatment at a temperature of 550° C. to 600° C. for 30 min or more.

Advantageous Effect

It is thus possible to obtain a steel for nitrocarburizing excellent in mechanical workability with an inexpensive chemical composition. By subjecting the steel for nitrocarburizing to nitrocarburizing treatment, a nitrocarburized component that has at least as high fatigue resistance as, for example, JIS SCr420 material subjected to carburizing treatment and has at least as little heat treatment distortion as JIS SCr420 material can be obtained. Such a nitrocarburized component is very useful as machine structural components of vehicles and the like.

DETAILED DESCRIPTION

A steel for nitrocarburizing and a nitrocarburized component according to one of the disclosed embodiments will be described in detail below.

The reasons for limiting the chemical composition of the steel for nitrocarburizing and the nitrocarburized component according to one of the disclosed embodiments to the foregoing range will be described below.

Herein, "%" representing the chemical composition denotes "mass %" unless otherwise specified.

C: 0.02% or More and Less than 0.15%

C is added to form bainite phase and ensure strength. If the C content is less than 0.02%, a sufficient amount of bainite phase cannot be obtained, and also the amounts of V and Nb precipitates after nitrocarburizing treatment are insufficient, which makes it difficult to ensure strength. The C content is therefore 0.02% or more. If the C content is 0.15% or more, the hardness of the bainite phase formed increases. Consequently, not only mechanical workability decreases, but also fatigue resistance decreases. The C content is therefore less than 0.15%. The C content is more preferably 0.04% or more and 0.13% or less. The C content is more preferably 0.04% or more. The C content is more preferably 0.13% or less.

Si: 0.30% or Less

Si is added as it is effective in deoxidation and bainite phase formation. If the Si content is more than 0.30%, solid solution hardening of ferrite and bainite phase causes degradation in machinability by cutting and cold workability. The Si content is therefore 0.30% or less. The Si content is preferably 0.25% or less, and more preferably 0.20% or less. For effective contribution to deoxidation, the Si content is preferably 0.01% or more.

Mn: 1.5% or More and 2.5% or Less

Mn is added as it is effective in bainite phase formation and strength improvement. If the Mn content is less than 1.5%, the amount of bainite phase formed is insufficient, and V and Nb precipitates form before nitrocarburizing treatment, so that the hardness before nitrocarburizing increases. Besides, the absolute amounts of V and Nb precipitates after nitrocarburizing treatment decrease, so that the hardness after nitrocarburizing treatment decreases. This makes it difficult to ensure strength. The Mn content is therefore 1.5% or more. If the Mn content is more than 2.5%, continuous casting cracks tend to occur, and machinability by cutting and cold workability decrease. The Mn content is therefore 2.5% or less. The Mn content is preferably 1.5% or more and 2.4% or less, and more preferably 1.6% or more and 2.3% or less. The Mn content is preferably 1.6% or more. The Mn content is preferably 2.4% or less, and more preferably 2.3% or less.

P: 0.025% or Less

P is an element that segregates to austenite grain boundaries and decreases the grain boundary strength, thus promoting continuous casting cracks and causing lower strength and toughness. Hence, the P content is desirably as low as possible, yet up to 0.025% of P is allowable. Reducing the P content to less than 0.001% requires high costs, and accordingly the P content may be 0.001% or more in industrial terms.

S: 0.06% or Less

S is a useful element as it forms MnS in the steel and improves machinability by cutting. If the S content is more than 0.06%, toughness and fatigue resistance decrease. The S content is therefore 0.06% or less. If the S content is more than 0.04%, continuous casting cracks tend to occur. Accordingly, the S content is preferably 0.04% or less, and more preferably 0.03% or less. To achieve the effect of improving machinability by cutting by S, the S content is preferably 0.002% or more.

Cr: 0.5% or More and 2.0% or Less

Cr is added as it is effective in bainite phase formation. Cr also has an effect of improving the surface hardness by forming nitrides by nitrocarburizing. If the Cr content is less than 0.5%, the amount of bainite phase formed is insufficient, and V and Nb precipitates form before nitrocarburizing treatment, so that the hardness before nitrocarburizing increases. Besides, the absolute amounts of V and Nb precipitates after nitrocarburizing treatment decrease, so that the hardness after nitrocarburizing treatment decreases. This makes it difficult to ensure strength. The Cr content is therefore 0.5% or more. If the Cr content is more than 2.0%, hot ductility decreases. Moreover, machinability by cutting degrades as a result of hardening. The Cr content is therefore 2.0% or less. The Cr content is preferably 0.5% or more and 1.5% or less. The Cr content is preferably 0.5% or more. The Cr content is preferably 1.5% or less.

Mo: 0.005% or More and 0.2% or Less

Mo is an important element, because it increases hardenability and eases bainite phase formation and thus has an effect of causing fine V and Nb precipitates to form and improving the strength of the nitrocarburized material. To improve the strength, the Mo content is 0.005% or more. Since Mo is an expensive element, if the Mo content is more than 0.2%, the component costs increase and the machinability by cutting decreases. The Mo content is therefore 0.005% or more and 0.2% or less. The Mo content is preferably 0.015% or more and 0.2% or less, and more preferably 0.04% or more and 0.20% or less. The Mo content is preferably 0.015% or more, and more preferably 0.04% or more. The Mo content is preferably 0.20% or less.

V: 0.02% or More and 0.20% or Less

V is an important element that, as a result of a temperature increase in nitrocarburizing, forms fine precipitates with Nb and increases the core hardness, thus improving the strength. To achieve the effect, the V content is 0.02% or more. If the V content is more than 0.20%, precipitates coarsen, and the strength improving effect is insufficient. Moreover, cracks in continuous casting are facilitated. In addition, the alloy costs increase. The V content is therefore 0.20% or less. The V content is preferably 0.02% or more and 0.18% or less.

Nb: 0.003% or More and 0.20% or Less

Nb is very effective in improving the fatigue strength because, as a result of a temperature increase in nitrocarburizing, Nb forms fine precipitates with V and increases the core hardness. To achieve this effect, the Nb content is 0.003% or more. If the Nb content is more than 0.20%, precipitates coarsen, and the strength improving effect is insufficient. Moreover, cracks in continuous casting are facilitated. The Nb content is therefore 0.20% or less. The Nb content is preferably 0.02% or more and 0.18% or less. The Nb content is preferably 0.02% or more. The Nb content is preferably 0.18% or less.

Al: More than 0.020% and 1.0% or Less

Al precipitates as MN and inhibits the growth of γ grains during hot working, and is accordingly added intentionally. In view of this, the Al content is more than 0.020%. If the Al content is more than 1.0%, the effect is saturated, and not only the toughness decreases but also cracks in continuous casting are facilitated. Besides, the component costs increase. The Al content is therefore 1.0% or less. The Al content is preferably more than 0.020% and 0.9% or less, and more preferably more than 0.020% and 0.8% or less.

Ti: More than 0.0050% and 0.015% or Less

Ti is a useful element that prevents cooling cracks in continuous casting and surface cracks in bending-bend restoration when using a bending continuous casting machine, and is accordingly added intentionally in a range of more than 0.0050%. If the Ti content is more than 0.015%, coarse TiN forms, and not only cracks in hot forging are facilitated but also the fatigue strength decreases. The Ti content is therefore 0.015% or less. The Ti content is preferably more than 0.0070% and 0.013% or less, and more preferably 0.0070% or more and 0.012% or less. The Ti content is preferably 0.0070% or more, and more preferably more than 0.0070%. The Ti content is preferably 0.013% or less, and more preferably 0.012% or less.

N: 0.0200% or Less

N is a useful element that forms carbonitrides in the steel and improves the strength of the nitrocarburized material. Accordingly, the N content is preferably 0.0020% or more. If the N content is more than 0.0200%, coarser carbonitrides form, causing a decrease in the toughness of the steel material. Moreover, surface cracks occur in the cast steel, and the cast steel quality decreases. The N content is therefore 0.0200% or less. The N content is more preferably 0.0180% or less.

Sb: 0.0030% or More and 0.010% or Less

Sb has an effect of suppressing grain boundary oxidation and surface cracks in casting and in hot rolling or hot forging and improving the surface quality of the product. If the Sb content is less than 0.0030%, the effect is insufficient. If the Sb content is more than 0.010%, the effect is saturated, and the component costs increase and also cracks in continuous casting are facilitated. The Sb content is therefore 0.0030% or more and 0.010% or less. The Sb content is more preferably 0.0040% or more and 0.010% or less.

Moreover, the following Expression (1) or (2) needs to be satisfied depending on the C content:

In the case where the C content is 0.02% or more and 0.10% or less, $$1.4 \leq A \leq 3.2 \tag{1}$$

where $A = 1000 \times \{7 \times (Ti/48) + 17 \times (Sb/122)\}$.

In the case where the C content is more than 0.10% and less than 0.15%, $$0.9 \leq A \leq 2.3 \tag{2}$$

where $A = 850 \times \{5 \times (Ti/48) + 13 \times (Sb/122)\}$.

As a result of the parameter relating to Ti and Sb being limited to the foregoing range, during hot rolling or hot forging, Ti carbonitrides precipitate in prior γ grain boundaries and suppress the growth of γ grains, so that heat treatment deformation lessens. If the Ti content is high, on the other hand, the precipitates coarsen, and the coarsening of γ grains cannot be suppressed sufficiently.

Sb concentrates (segregates) to γ grain boundaries and suppresses the coarsening of γ grains, so that heat treatment deformation lessens.

If the value A is less than the lower limit, the effect of suppressing the coarsening of γ grains is insufficient. If the value A is more than the upper limit, the surface characteristics degrade due to cracks in hot forging caused by the precipitation of coarse TiN and/or cracks in continuous casting caused by Sb.

The reason that the Ti content and the Sb content need to be adjusted by selectively using Expression (1) or (2) depending on the C content in the steel is because the contribution of Ti and Sb to the γ grain coarsening suppression differs depending on the C content in the steel. In the case where the C content is relatively low, Ti carbonitrides do not precipitate easily. Hence, it is necessary to increase the Ti content in order to precipitate Ti carbonitrides sufficient to suppress the coarsening of γ grains and increase the Sb content in order to compensate for the difficulty of the precipitation of Ti carbonitrides. Accordingly, in the case where the C content in the steel is relatively low (0.02% or more and 0.10% or less), the coefficients for the Ti content and the Sb content in the calculation of the value A and the lower limit of the value A are each greater than those in the case where the C content in the steel is relatively high (more than 0.10% and less than 0.15%).

The basic chemical composition according to one of the disclosed embodiments contains the components described above, with the balance consisting of Fe and inevitable impurities.

One or more of B, Cu, and Ni may be optionally added to the above-described basic chemical composition.

B: 0.010% or Less

B has an effect of improving hardenability and facilitating the formation of bainite microstructure. Hence, the B content is preferably 0.0003% or more. If the B content is more than 0.010%, B precipitates as BN, and not only the hardenability improving effect is saturated but also the component costs increase. Accordingly, in the case of adding B, the B content is 0.010% or less. The B content is more preferably 0.0005% or more and 0.008% or less. The B content is more preferably 0.0005% or more. The B content is more preferably 0.008% or less.

Cu: 0.30% or Less

Cu forms intermetallic compounds with Fe and Ni during nitrocarburizing treatment and contributes to improved strength of the nitrocarburized material by precipitation hardening, and is also effective in bainite phase formation. To achieve the effect, the Cu content is preferably 0.05% or more. If the Cu content is more than 0.30%, hot workability decreases. The Cu content is therefore preferably 0.30% or less. The Cu content is more preferably 0.25% or less.

Ni: 0.30% or Less

Ni has an effect of increasing hardenability and reducing low-temperature brittleness. To achieve the effect, the Ni content is preferably 0.05% or more. If the Ni content is more than 0.30%, hardness increases, and as a result machinability by cutting decreases. This is also disadvantageous in terms of cost. The Ni content is therefore preferably 0.30% or less. The Ni content is more preferably 0.25% or less.

In addition to the foregoing components, one or more of Co, Zr, Hf, Ta, and W may be further added.

Co: 0.2% or Less, Zr: 0.2% or Less, Hf: 0.3% or Less, Ta: 0.3% or Less, W: 0.4% or Less Co, Zr, Hf, Ta, and W are each an element effective in improving the strength of the steel, and the content of each element is preferably 0.01% or more. If the Co content and the Zr content are each more than 0.2%, if the Hf content and the Ta content are each more than 0.3%, and if the W content is more than 0.4%, toughness decreases. Accordingly, the upper limit of each of the Co content and the Zr content is preferably 0.2%, the upper limit of each of the Hf content and the Ta content is preferably 0.3%, and the upper limit of the W content is preferably 0.4%. More preferable contents of these elements are: Co: 0.02% to 0.18%, Zr: 0.02% to 0.18%, Hf: 0.03% to 0.25%, Ta: 0.03% to 0.25%, and W: 0.04% to 0.35%. The Co content is more preferably 0.02% or more. The Co content is more preferably 0.18% or less. The Zr content is more preferably 0.02% or more. The Zr content is more preferably 0.18% or less. The Hf content is more preferably 0.03% or more. The Hf content is more preferably 0.25% or less. The Ta content is more preferably 0.03% or more. The Ta content is more preferably 0.25% or less. The W content is more preferably 0.04% or more. The W content is more preferably 0.35% or less.

In addition to the foregoing components, one or more of Pb, Bi, Zn, and Sn may be further added.

Pb: 0.2% or Less, Bi: 0.2% or Less, Zn: 0.3% or Less, Sn: 0.3% or Less

Pb, Bi, Zn, and Sn are each an element that has an effect of improving the machinability by cutting of the steel. Each of the Pb content and the Bi content is preferably 0.02% or more, and each of the Zn content and the Sn content is preferably 0.03% or more. If the Pb content and the Bi content are each more than 0.2% and if the Zn content and the Sn content are each more than 0.3%, strength and toughness decrease. Accordingly, the upper limit of each of the Pb content and the Bi content is preferably 0.2%, and the upper limit of each of the Zn content and the Sn content is preferably 0.3%.

The chemical composition of the steel suffices to contain the foregoing elements and the balance consisting of Fe and inevitable impurities. The chemical composition of the steel preferably consists of the foregoing elements and the balance consisting of Fe and inevitable impurities.

The steel microstructure in the steel for nitrocarburizing according to one of the disclosed embodiments will be described below.

[Bainite Phase: More than 50% in Area Ratio]

It is very important to limit the area ratio of bainite phase with respect to the entire microstructure to more than 50%.

The presently disclosed technique is intended to cause V and Nb precipitates to be dispersion-precipitated in nitrocarburizing treatment, to increase the nitrided layer and the core hardness and improve the fatigue resistance after the nitrocarburizing treatment. In detail, the presence of a large amount of V and Nb precipitates before the nitrocarburizing treatment is normally disadvantageous in terms of machinability by cutting during cutting work performed before the nitrocarburizing treatment. Moreover, in bainite transformation, V and Nb precipitates are less likely to form in the matrix phase than in ferrite-pearlite transformation. Hence, the steel microstructure of the steel for nitrocarburizing, i.e. the steel microstructure before the nitrocarburizing treatment, according to one of the disclosed embodiments is mainly composed of bainite phase. Specifically, the area ratio of bainite phase with respect to the entire microstructure is more than 50%. The area ratio of bainite phase is preferably more than 60%, and more preferably more than 80%. The area ratio of bainite phase may be 100%.

Microstructures other than bainite phase are, for example, ferrite phase and pearlite phase. The area ratios of these other microstructures are preferably as low as possible.

The area ratio of each phase can be measured as follows. A test piece is collected from the steel for nitrocarburizing, and cut at a given position. The cut section is polished, and then etched by natal. The types of phases are identified using an optical microscope or a scanning electron microscope (SEM) through cross-sectional microstructure observation (optical microscope microstructure observation with 150 magnification), and the area ratio of each phase is determined.

[Prior Austenite Grain Size: 100 µm or Less]

The prior austenite grain size influences heat treatment distortion in the nitrocarburizing treatment. The prior austenite grain size is also an important factor that controls the fatigue strength and the toughness. If the prior austenite grain size is more than 100 µm, heat treatment distortion in the nitrocarburizing treatment increases, and the fatigue strength and the toughness decrease. The prior austenite grain size is therefore 100 µm or less.

The prior austenite grain size can be measured as follows. From the optical microscope observation results of the etched test piece with which the area ratio of each phase is determined, prior austenite grain boundaries are identified, and the average value of the equivalent circular diameters of prior austenite grains is calculated.

[Number of Ti Precipitates with Equivalent Circular Particle Size of 30 Nm or Less: 300 or More Per µm$^2$]

If a predetermined amount of Ti precipitates is dispersion-precipitated in bainite phase, the growth of prior austenite grains during hot working can be suppressed, and heat treatment distortion that can occur during subsequent nitrocarburizing treatment can be reduced. Prior austenite grains decrease in size during cooling following hot rolling and hot forging, and heat treatment distortion that can occur during subsequent nitrocarburizing treatment can be reduced. To achieve this, the number of Ti precipitates with an equivalent circular diameter of 30 nm or less needs to be 300 or more per µm$^2$. The reason for limiting the number of Ti precipitates with an equivalent circular diameter of 30 nm or less is because an effective way of reducing heat treatment distortion after the nitrocarburizing treatment is to suppress the coarsening of prior austenite grains and Ti precipitates with an equivalent circular diameter of 30 nm or less contribute to suppressing the coarsening of prior austenite grains. Here, the measurement limit of the precipitate particle size is about 1 nm. By limiting the number of such Ti precipitates that disperse to 300 or more per $\mu m^2$, the coarsening of prior austenite grains in the steel for nitrocarburizing can be reliably suppressed.

The number of Ti precipitates with an average particle size of 30 nm or less that disperse can be measured as follows. A test piece for transmission electron microscope observation is obtained from the core of the nitrocarburized material by twin-jet electropolishing, and precipitates in the obtained test piece are observed using a transmission electron microscope (TEM). Further, the compositions of the observed precipitates are determined with an energy-dispersive X-ray spectrometer (EDX).

[Segregation of Sb to Prior Austenite Grain Boundaries]

Sb has an effect of preventing prior austenite grains from coarsening by segregating to and existing in prior austenite grain boundaries. If Sb segregates to prior austenite grain boundaries during hot working, prior austenite grains decrease in size during subsequent cooling, and heat treatment distortion that can occur during subsequent nitrocarburizing treatment can be reduced.

The state of distribution of Sb is observed using a color mapping image obtained by an electron probe microanalyzer (EPMA) after a section orthogonal to the rolling direction is mirror polished for finish. Since Sb segregated to grain boundaries is observed as circles in prior austenite grain boundaries, whether Sb has segregated to prior austenite grain boundaries can be determined through image analysis.

[Component]

A component is obtained by performing nitrocarburizing treatment on the steel for nitrocarburizing having the foregoing chemical composition and steel microstructure. The component includes a core having the chemical composition and steel microstructure of the steel for nitrocarburizing, and a surface layer having a chemical composition containing nitrogen and carbon in larger amounts than the chemical composition of the core. Its steel microstructure preferably includes precipitates containing V and/or Nb in bainite phase.

That is, the component according to one of the disclosed embodiments is preferably produced by subjecting the foregoing steel for nitrocarburizing to nitrocarburizing treatment to cause precipitates containing V and Nb to be dispersion-precipitated in bainite phase. As a result of the precipitates containing V and Nb being dispersion-precipitated in the microstructure of at least the core, the hardness of at least the core increases, and the fatigue strength after the nitrocarburizing treatment is significantly improved.

The core herein denotes the region excluding the surface layer, i.e. the hardened case in which nitrogen and carbon have been diffused by nitrocarburizing. It is preferable to disperse precipitates containing V and Nb in bainite phase in not only the core but also other regions.

The average particle size of the precipitates containing V and Nb in bainite phase is preferably less than 10 nm, in terms of strengthening by precipitation after the nitrocarburizing treatment. Here, the measurement limit of the precipitate particle size is about 1 nm.

A method of producing the steel for nitrocarburizing and the component according to one of the disclosed embodiments will be described below.

Figure 1:
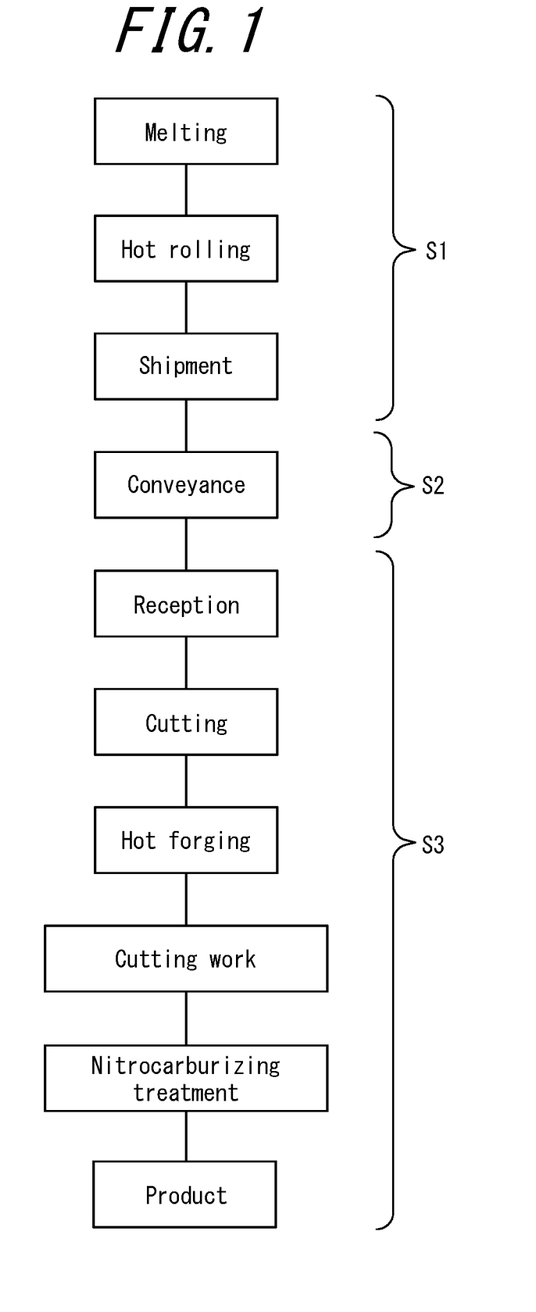
FIG. 1 is a schematic diagram illustrating a process of producing a nitrocarburized component.

FIG. 1 illustrates a typical process of producing a nitrocarburized component using the steel for nitrocarburizing (e.g. steel bar) according to one of the disclosed embodiments. The method includes production of a steel bar as material (S1), conveyance (S2), and finishing (S3).

First, in the steel bar production (S1), cast steel is hot rolled to obtain a billet, and then the billet is hot rolled to obtain a steel bar. Subsequently, the steel bar is shipped after quality inspection. In the finishing (S3) after the conveyance (S2), the steel bar is cut to predetermined dimensions, hot forged, and optionally subjected to cutting work such as drill boring or lathe turning to form a desired shape (e.g. a gear or a shaft). After this, nitrocarburizing treatment is performed to obtain a component.

The hot-rolled material in S1 may be directly finished into a desired shape by cutting work such as lathe turning or drill boring, and then subjected to nitrocarburizing treatment to obtain a component. In the case of performing hot forging, the hot forging may be followed by cold straightening. The final product may be subjected to coating treatment such as painting or plating.

In the method of producing the steel for nitrocarburizing according to one of the disclosed embodiments, it is important to, before the nitrocarburizing treatment, perform first hot working of working at a heating temperature of 1200° C. or more and then cooling to 400° C. or less at a cooling rate in a temperature range of 650° C. to 400° C. of 0.2° C./s or more and thereafter perform second hot working of working at a heating temperature of 1200° C. or more and then cooling at a cooling rate in a temperature range of 700° C. to 550° C. of 0.4° C./s or more, thereby forming the foregoing steel microstructure.

As the working in each of the first hot working and the second hot working, hot rolling or hot forging may be used.

[Heating Temperature in First Hot Working: 1200° C. or More]

In the first hot working, e.g. hot rolling, carbides remaining from the time of melting are dissolved in order to prevent coarse carbonitrides from precipitating in the working material (e.g. the steel bar as the raw material of the forged component) and impairing the fatigue strength. If the heating temperature is less than 1200° C., carbides remaining from the time of melting are unlikely to dissolve sufficiently. The heating temperature is therefore 1200° C. or more. The heating temperature is preferably 1200° C. to 1250° C.

[Cooling Conditions in First Hot Working: Cooling to 400° C. or Less at Cooling Rate in Temperature Range of 650° C. to 400° C. of 0.2° C./s or More]

The cooling in the first hot working is performed to create the state in which Sb segregates to prior austenite grain boundaries. If the cooling rate in a temperature range of 650° C. to 400° C. is less than 0.2° C./s, Sb, which has preferentially precipitated in grain boundaries immediately above this temperature range, diffuse. And consequently, the state in which Sb segregates to prior austenite grain boundaries cannot be achieved. Hence, after hot rolling or hot forging, cooling needs to be performed to 400° C. or less at a cooling rate in a temperature range of 650° C. to 400° C. of 0.2° C./s or more.

[Heating Temperature in Second Hot Working: 1200° C. or More]

In the second hot working, e.g. hot forging, carbides are dissolved in order to prevent coarse carbonitrides from precipitating in the forging material after above-mentioned hot working and impairing the fatigue strength. If the heating temperature in the forging or the like is less than 1200° C., carbides are unlikely to dissolve sufficiently. The heating temperature in the forging or the like is therefore 1200° C. or more. The heating temperature is preferably 1200° C. to 1250° C.

[Cooling Conditions in Second Hot Working: Cooling Rate in Temperature Range of 700° C. to 550° C.: 0.4° C./s or More]

If the cooling rate from 700° C. to 550° C. after hot rolling or hot forging is less than 0.4° C./s, the area ratio of bainite phase is not more than 50%. In this case, fine precipitates form, and the material becomes hard. As a result, in cutting work, the cutting resistance increases and the tool life decreases. Accordingly, in the temperature range of 700° C. to 550° C. which is the precipitation temperature range of fine precipitates, the cooling rate after working such as forging is set to be more than or equal to 0.4° C./s which is the limit cooling rate at which fine precipitates are obtained. If the cooling rate is more than 200° C./s, hard martensite phase forms, and the machinability by cutting decreases significantly. The upper limit of the cooling rate is therefore preferably 200° C./s.

The resultant rolled material or forged material is then subjected to cutting work and the like to form a component shape, and then subjected to nitrocarburizing treatment under the below-described conditions. A nitrocarburized component can thus be produced.

A method of producing a nitrocarburized component using the steel for nitrocarburizing according to one of the disclosed embodiments will be described below. The nitrocarburized component can be produced by forming the steel for nitrocarburizing into a component shape by optionally performing cutting and the like and then subjecting the steel for nitrocarburizing to nitrocarburizing treatment.

[Nitrocarburizing Treatment Conditions]

The nitrocarburizing treatment is performed at a nitrocarburizing treatment temperature of 550° C. to 600° C. for a treatment time of 30 min or more so that fine precipitates form. The reason for limiting the nitrocarburizing treatment temperature to a range of 550° C. to 600° C. is as follows: If the nitrocarburizing treatment temperature is less than 550° C., a sufficient amount of precipitates cannot be obtained. If the nitrocarburizing treatment temperature is more than 600° C., the decomposition of nitrocarburizing atmosphere gas is insufficient, which hinders nitrocarburizing. The nitrocarburizing treatment temperature is more preferably in a range of 560° C. to 590° C. The nitrocarburizing treatment temperature is more preferably 560° C. or more. The nitrocarburizing treatment temperature is more preferably 590° C. or less.

The nitrocarburizing treatment infiltrates and diffuses N and C simultaneously. Accordingly, the nitrocarburizing treatment may be performed in a mixed atmosphere of a nitriding gas such as $NH_3$ or $N_2$ and a carburizing gas such as $CO_2$ or CO, e.g. an atmosphere of $NH_3:N_2:CO_2=50:45:5$.

EXAMPLES

Examples will be described in detail below.

Steels (steel samples No. 1 to 39) having the compositions shown in Table 1 were each formed into cast steel of 300 mm×300 mm in cross section by a continuous casting machine. Whether the cast steel had cracks at the surface was examined. The cast steel was soaked at 1250° C. for 30 min, and then hot rolled to obtain a billet with a rectangular section of 150 mm on a side. After this, the billet was subjected to hot rolling as the first hot working according to the conditions shown in Table 2, to obtain a bar-shaped raw material as hot rolled of 50 mmφ. The raw material as hot rolled was then subjected to hot forging as the second hot working according to the conditions shown in Table 2, to obtain a hot forged material (steel bar) of 38 mmφ. Subsequently, the hot forged material was cooled to room temperature according to the conditions shown in Table 2.

The machinability by cutting of each of the resultant hot forged materials was evaluated by an outer periphery turning test. As the test material, the hot forged material was cut to a length of 200 mm. As the cutting tool, CSBNR 2020 produced by Mitsubishi Materials Corporation was used as the folder and SNGN 120408 $UTi_20$ high-speed tool steel produced by Mitsubishi Materials Corporation was used as the tip. The conditions of the outer periphery turning test are as follows: cutting depth: 1.0 mm, feed rate: 0.25 mm/rev, cutting rate: 200 m/min, and no lubricant. As an evaluation item, the tool life was defined as the time until the tool wear (flank wear) reached 0.3 mm.

In addition, microstructure observation and hardness measurement were performed on each of the hot forged materials. In the microstructure observation, the types of phases were identified and the area ratio of bainite phase was determined by the above-described method.

In the hardness measurement, the hardness at one-fourth the diameter from the surface was measured at five locations with a test load of 2.94 N (300 gf) using a Vickers hardness meter in accordance with JIS Z 2244, and the average value was taken to be hardness HV.

In addition, from the position of one-fourth the diameter in radial depth from the surface of the hot forged material, a test piece for transmission electron microscope observation was obtained by twin-jet electropolishing, and precipitates in the obtained test piece were observed using a transmission electron microscope with an acceleration voltage of 200 V. Further, the compositions of the observed precipitates were determined with an energy-dispersive X-ray spectrometer (EDX).

For steel samples No. 1 to 39, nitrocarburizing treatment was performed after the hot forging. In the nitrocarburizing treatment, the hot forged material was heated at 525° C. to 620° C. in an atmosphere of $NH_3:N_2:CO_2=50:45:5$ and held for 2 hr.

For the hot forged material of steel sample No. 40, carburizing treatment was performed for comparison. In the carburizing treatment, the hot forged material was carburized at 930° C. for 3 hr, held at 850° C. for 40 min, then oil quenched, and further tempered at 170° C. for 1 hr.

For each of the obtained nitrocarburized materials and carburizing-heat-treated materials, microstructure observation, hardness measurement, and fatigue resistance evaluation were performed, and also a heat treatment distortion test was conducted.

In the microstructure observation, the types of phases were identified and the area ratio of bainite phase was determined by the above-described method, as in the microstructure observation before the nitrocarburizing treatment.

In the hardness measurement, the surface (surface layer) hardness of the heat-treated material was measured at a position of 0.05 mm from the surface, and the core hardness of the heat-treated material was measured at a position of one-fourth the diameter in radial depth from the surface (hereafter simply referred to as "¼ position"). The surface hardness and the core hardness were both measured at six locations with a test load of 2.94 N (300 gf) using a Vickers hardness meter in accordance with JIS Z 2244, and the respective average values were taken to be surface hardness HV and core hardness HV. As the hardened case depth, the depth of a region with HV of 520 or more from the surface was measured.

Figure 2:
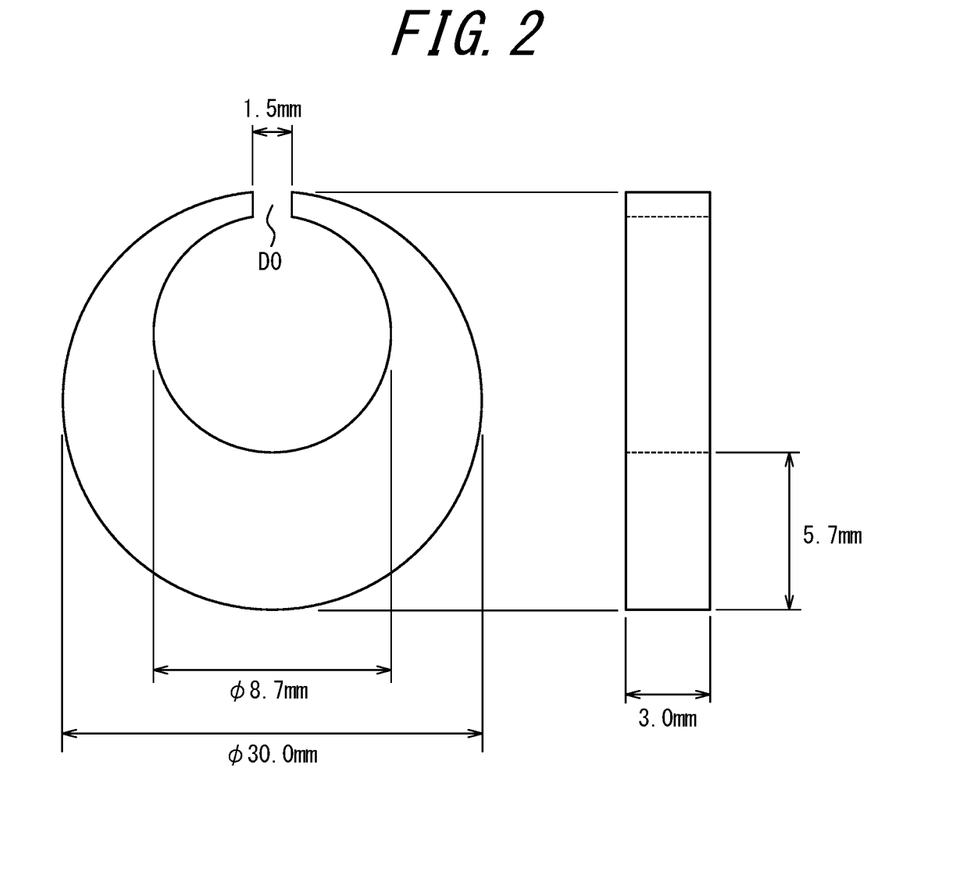
FIG. 2 is a diagram illustrating the shape of a test piece for evaluating heat treatment distortion.

The heat treatment distortion test was performed using a C type test piece collected from the steel bar after the hot forging. FIG. 2 illustrates the C type test piece. Before the nitrocarburizing treatment, an opening D0 was measured using a micrometer. An opening D1 after the nitrocarburizing treatment was then measured. As the heat treatment distortion, an opening ratio: 100×(D1−D0)/D0(%) was calculated. The heat treatment distortion property was ranked as follows: I: opening ratio of 0% to 1%; II: opening ratio of more than 1% and 2% or less; and III: opening ratio of more than 2%.

Moreover, from the ¼ position of each of the nitrocarburized materials and the carburized materials, a test piece for transmission electron microscope observation was obtained by twin-jet electropolishing, and precipitates in the obtained test piece were observed using a transmission electron microscope with an acceleration voltage of 200 V.

Further, the compositions of the observed precipitates were determined with an energy-dispersive X-ray spectrometer (EDX).

The measurement results and the evaluation results are shown in Table 2. No. 1 to 14 and 19 are Examples (Ex.), No. 15 to 18 and 20 to 45 are Comparative Examples (Comp. Ex.), and No. 46 is a Conventional Example (Cony. Ex.) produced by subjecting steel equivalent to JIS SCr420 to carburizing treatment.

As is clear from Table 2, in all of Examples No. 1 to 14 and 19, heat treatment distortion was reduced as compared with Conventional Example No. 46 subjected to carburizing treatment. Moreover, the machinability by cutting before nitrocarburizing treatment in Examples No. 1 to 14 and 19 was superior to that in Conventional Example No. 46.

In Comparative Examples No. 15 to 18 and 20 to 45, the chemical composition or the resultant steel microstructure was outside the presently disclosed range, so that cracks occurred in continuous casting, heat treatment distortion was large, or the machinability by cutting was poor.

TABLE 1

(mass %)

| Steel sample No. | C | Si | Mn | P | S | Cr | Mo | V | Nb | Al | Ti | N | Sb | Others | Value A* | Category |
|---|---|---|---|---|---|---|---|---|---|---|---|---|---|---|---|---|
| 1 | 0.05 | 0.07 | 1.85 | 0.004 | 0.020 | 1.25 | 0.01 | 0.10 | 0.05 | 0.053 | 0.015 | 0.0085 | 0.0051 | — | 2.90 | Ex. |
| 2 | 0.10 | 0.10 | 1.75 | 0.012 | 0.016 | 1.15 | 0.20 | 0.14 | 0.07 | 0.021 | 0.006 | 0.0055 | 0.0050 | — | 1.57 | Ex. |
| 3 | 0.14 | 0.24 | 1.52 | 0.010 | 0.015 | 1.23 | 0.15 | 0.18 | 0.05 | 0.025 | 0.006 | 0.0035 | 0.0100 | — | 1.44 | Ex. |
| 4 | 0.08 | 0.30 | 1.89 | 0.013 | 0.016 | 1.89 | 0.13 | 0.09 | 0.20 | 0.135 | 0.012 | 0.0102 | 0.0069 | — | 2.71 | Ex. |
| 5 | 0.07 | 0.25 | 2.23 | 0.009 | 0.012 | 1.26 | 0.09 | 0.12 | 0.18 | 0.530 | 0.013 | 0.0078 | 0.0095 | — | 3.22 | Ex. |
| 6 | 0.06 | 0.07 | 1.76 | 0.010 | 0.016 | 1.35 | 0.19 | 0.20 | 0.08 | 0.546 | 0.010 | 0.0065 | 0.0091 | — | 2.73 | Ex. |
| 7 | 0.07 | 0.05 | 1.75 | 0.007 | 0.015 | 1.65 | 0.14 | 0.18 | 0.12 | 0.625 | 0.011 | 0.0054 | 0.0045 | B: 0.0005 | 2.23 | Ex. |
| 8 | 0.08 | 0.02 | 1.80 | 0.012 | 0.020 | 0.52 | 0.13 | 0.20 | 0.08 | 0.520 | 0.009 | 0.0103 | 0.0030 | Cu: 0.1 | 1.73 | Ex. |
| 9 | 0.06 | 0.06 | 1.46 | 0.009 | 0.006 | 0.65 | 0.07 | 0.14 | 0.12 | 0.265 | 0.007 | 0.0099 | 0.0035 | Cu: 0.1, Ni: 0.15 | 1.51 | Ex. |
| 10 | 0.10 | 0.05 | 1.50 | 0.010 | 0.028 | 0.98 | 0.18 | 0.15 | 0.20 | 0.025 | 0.008 | 0.0065 | 0.0065 | Co: 0.15 | 2.07 | Ex. |
| 11 | 0.09 | 0.12 | 1.77 | 0.011 | 0.018 | 1.78 | 0.09 | 0.09 | 0.19 | 0.031 | 0.013 | 0.0046 | 0.0031 | Zr: 0.1, Hf: 0.2 | 2.33 | Ex. |
| 12 | 0.05 | 0.04 | 1.96 | 0.020 | 0.016 | 1.62 | 0.11 | 0.18 | 0.06 | 0.650 | 0.006 | 0.0078 | 0.0099 | Ta: 0.2, W: 0.3 | 2.25 | Ex. |
| 13 | 0.11 | 0.11 | 2.45 | 0.025 | 0.020 | 1.34 | 0.13 | 0.13 | 0.15 | 0.125 | 0.015 | 0.0123 | 0.0085 | Pb: 0.2, Bi: 0.15 | 2.10 | Ex. |
| 14 | 0.14 | 0.25 | 2.34 | 0.017 | 0.060 | 1.31 | 0.19 | 0.15 | 0.04 | 0.086 | 0.015 | 0.0089 | 0.0063 | Zu: 0.3, Sn: 0.2 | 1.90 | Ex. |
| 15 | 0.01 | 0.12 | 1.86 | 0.010 | 0.025 | 1.35 | 0.15 | 0.12 | 0.12 | 0.036 | 0.012 | 0.0078 | 0.0098 | — | 3.12 | Comp. Ex. |
| 16 | 0.17 | 0.10 | 1.75 | 0.015 | 0.024 | 1.52 | 0.14 | 0.14 | 0.07 | 0.036 | 0.013 | 0.0078 | 0.0098 | — | 2.04 | Comp. Ex. |
| 17 | 0.09 | 0.33 | 1.75 | 0.013 | 0.022 | 1.63 | 0.11 | 0.16 | 0.08 | 0.053 | 0.012 | 0.0076 | 0.0031 | — | 2.18 | Comp. Ex. |
| 18 | 0.15 | 0.25 | 1.44 | 0.015 | 0.020 | 1.18 | 0.07 | 0.15 | 0.10 | 0.089 | 0.009 | 0.0075 | 0.0056 | — | 1.30 | Comp. Ex. |
| 19 | 0.12 | 0.06 | 2.62 | 0.020 | 0.021 | 1.65 | 0.07 | 0.19 | 0.05 | 0.036 | 0.008 | 0.0025 | 0.0083 | — | 1.46 | Comp. Ex. |
| 20 | 0.09 | 0.11 | 1.72 | 0.026 | 0.019 | 1.98 | 0.08 | 0.13 | 0.06 | 0.089 | 0.015 | 0.0036 | 0.0032 | — | 2.63 | Comp. Ex. |
| 21 | 0.07 | 0.12 | 2.31 | 0.019 | 0.065 | 1.43 | 0.23 | 0.15 | 0.06 | 0.145 | 0.012 | 0.0105 | 0.0031 | — | 2.18 | Comp. Ex. |
| 22 | 0.14 | 0.14 | 1.60 | 0.020 | 0.022 | 0.44 | 0.09 | 0.10 | 0.06 | 0.330 | 0.014 | 0.0023 | 0.0062 | — | 1.80 | Comp. Ex. |
| 23 | 0.08 | 0.03 | 1.61 | 0.015 | 0.015 | 2.12 | 0.12 | 0.11 | 0.06 | 0.236 | 0.015 | 0.0069 | 0.0075 | — | 3.23 | Comp. Ex. |
| 24 | 0.12 | 0.06 | 1.61 | 0.015 | 0.022 | 1.64 | 0.004 | 0.12 | 0.07 | 0.055 | 0.010 | 0.0065 | 0.0069 | — | 1.51 | Comp. Ex. |
| 25 | 0.05 | 0.06 | 1.85 | 0.010 | 0.015 | 1.25 | 0.250 | 0.15 | 0.10 | 0.025 | 0.010 | 0.0069 | 0.0050 | — | 2.16 | Comp. Ex. |
| 26 | 0.13 | 0.23 | 1.65 | 0.016 | 0.019 | 1.94 | 0.10 | 0.01 | 0.05 | 0.025 | 0.011 | 0.0074 | 0.0045 | — | 1.38 | Comp. Ex. |
| 27 | 0.14 | 0.24 | 1.95 | 0.012 | 0.017 | 1.63 | 0.13 | 0.22 | 0.08 | 0.021 | 0.013 | 0.0097 | 0.0071 | — | 1.79 | Comp. Ex. |
| 28 | 0.11 | 0.08 | 1.75 | 0.015 | 0.022 | 1.84 | 0.06 | 0.12 | 0.002 | 0.786 | 0.011 | 0.0145 | 0.0041 | — | 1.35 | Comp. Ex. |
| 29 | 0.09 | 0.05 | 1.65 | 0.010 | 0.020 | 1.69 | 0.06 | 0.15 | 0.280 | 0.056 | 0.014 | 0.0065 | 0.0031 | — | 2.47 | Comp. Ex. |
| 30 | 0.10 | 0.06 | 1.64 | 0.013 | 0.023 | 1.43 | 0.06 | 0.14 | 0.05 | 0.018 | 0.010 | 0.0098 | 0.0032 | — | 1.90 | Comp. Ex. |
| 31 | 0.08 | 0.08 | 1.68 | 0.016 | 0.016 | 1.62 | 0.06 | 0.08 | 0.05 | 1.123 | 0.013 | 0.0111 | 0.0045 | — | 2.52 | Comp. Ex. |
| 32 | 0.11 | 0.12 | 1.63 | 0.015 | 0.018 | 1.61 | 0.16 | 0.14 | 0.09 | 0.030 | 0.004 | 0.0059 | 0.0075 | — | 1.03 | Comp. Ex. |
| 33 | 0.13 | 0.25 | 1.59 | 0.023 | 0.012 | 1.40 | 0.21 | 0.15 | 0.08 | 0.025 | 0.023 | 0.0199 | 0.0095 | — | 2.90 | Comp. Ex. |
| 34 | 0.07 | 0.24 | 1.53 | 0.012 | 0.016 | 1.54 | 0.15 | 0.09 | 0.011 | 0.021 | 0.011 | 0.0203 | 0.0046 | — | 2.25 | Comp. Ex. |
| 35 | 0.08 | 0.29 | 1.69 | 0.015 | 0.015 | 1.36 | 0.12 | 0.12 | 0.13 | 0.022 | 0.007 | 0.0067 | 0.0029 | — | 1.42 | Comp. Ex. |
| 36 | 0.06 | 0.06 | 1.45 | 0.009 | 0.021 | 1.43 | 0.10 | 0.15 | 0.16 | 0.350 | 0.006 | 0.0132 | 0.0123 | — | 2.59 | Comp. Ex. |
| 37 | 0.07 | 0.05 | 1.53 | 0.012 | 0.008 | 1.34 | 0.08 | 0.12 | 0.15 | 0.023 | 0.006 | 0.0123 | 0.0033 | — | 1.33 | Comp. Ex. |
| 38 | 0.12 | 0.15 | 1.66 | 0.008 | 0.025 | 1.15 | 0.11 | 0.08 | 0.13 | 0.022 | 0.006 | 0.0077 | 0.0034 | — | 0.84 | Comp. Ex. |
| 39 | 0.08 | 0.13 | 1.78 | 0.019 | 0.025 | 1.37 | 0.15 | 0.18 | 0.17 | 0.450 | 0.014 | 0.0153 | 0.0098 | — | 3.41 | Comp. Ex. |
| 40 | 0.21 | 0.25 | 0.83 | 0.015 | 0.015 | 1.25 | 0.001 | 0.005 | 0.001 | 0.027 | 0.001 | 0.0057 | — | — | — | Conv. Ex. |

*Value A = 1000 × {7 × (Ti/48) + 17 × (Sb/122)} (C: 0.02% or more and 0.10% or less): 1.4 to 3.2
Value A = 850 × {5 × (Ti/48) + 13 × (Sb/122)} (C: more than 0.10% and less than 0.15%): 0.9 to 2.3

TABLE 2

| | | | First hot working (hot rolling) | | | Second hot working (hot forging) | | Steel properties (before nitrocarburizing treatment) | | | | | |
|---|---|---|---|---|---|---|---|---|---|---|---|---|---|
| No. | Steel sample No. | *4 Surface defect | Heating temperature (° C.) | Cooling temperature (° C.) | Cooling rate from 650 to 400° C. after rolling (° C./s) | Heating temperature (° C.) | Cooling rate from 700 to 550° C. after forging (° C./s) | Core hardness HV | Steel microstructure | Bainite phase area ratio (%) | Prior γ grain size (*μm) | Presence of grain boundary segregation of Sb | Dispersion state of Ti carbonitrides (number/μm²) |
| 1 | 1 | Absent | 1220 | 250 | 0.3 | 1230 | 0.6 | 250 | Mainly B | 93 | 50 | Present | 350 |
| 2 | 2 | Absent | 1220 | 250 | 0.3 | 1230 | 0.6 | 298 | Mainly B | 99 | 45 | Present | 545 |
| 3 | 3 | Absent | 1220 | 250 | 0.3 | 1230 | 0.6 | 314 | Mainly B | 98 | 30 | Present | 520 |
| 4 | 4 | Absent | 1220 | 250 | 0.3 | 1230 | 0.6 | 279 | Mainly B | 96 | 42 | Present | 390 |
| 5 | 5 | Absent | 1220 | 250 | 0.3 | 1230 | 0.5 | 277 | Mainly B | 97 | 38 | Present | 322 |
| 6 | 6 | Absent | 1220 | 250 | 0.3 | 1230 | 0.6 | 282 | Mainly B | 99 | 40 | Present | 412 |
| 7 | 7 | Absent | 1220 | 250 | 0.3 | 1230 | 0.6 | 277 | Mainly B | 95 | 45 | Present | 356 |
| 8 | 8 | Absent | 1220 | 250 | 0.3 | 1230 | 0.6 | 282 | Mainly B | 97 | 35 | Present | 375 |
| 9 | 9 | Absent | 1220 | 250 | 0.3 | 1230 | 0.5 | 249 | Mainly B | 59 | 63 | Present | 403 |
| 10 | 10 | Absent | 1220 | 250 | 0.3 | 1230 | 0.6 | 289 | Mainly B | 94 | 48 | Present | 385 |
| 11 | 11 | Absent | 1220 | 250 | 0.3 | 1230 | 0.4 | 278 | Mainly B | 61 | 85 | Present | 433 |
| 12 | 12 | Absent | 1220 | 250 | 0.3 | 1230 | 0.6 | 274 | Mainly B | 98 | 51 | Present | 333 |
| 13 | 13 | Absent | 1220 | 250 | 0.3 | 1230 | 0.5 | 280 | Mainly B | 97 | 46 | Present | 462 |
| 14 | 14 | Absent | 1220 | 250 | 0.3 | 1230 | 0.6 | 301 | Mainly B | 98 | 38 | Present | 603 |
| 15 | 1 | Absent | 1150 | 250 | 0.3 | 1230 | 0.6 | 275 | Mainly B | 85 | 125 | Present | 123 |
| 16 | 1 | Absent | 1220 | 250 | 0.3 | 1230 | 0.3 | 220 | F + P + B | 24 | 153 | Present | 280 |
| 17 | 1 | Absent | 1220 | 250 | 0.3 | 1230 | 0.2 | 210 | F + P + B | 15 | 165 | Present | 186 |
| 18 | 1 | Absent | 1220 | 250 | 0.1 | 1230 | 0.6 | 225 | Mainly B | 92 | 120 | Absent | 450 |
| 19 | 1 | Absent | 1220 | 250 | 0.2 | 1230 | 0.6 | 250 | Mainly B | 90 | 55 | Present | 320 |
| 20 | 1 | Absent | 1220 | 250 | 0.3 | 1230 | 0.2 | 229 | F + P + B | 49 | 108 | Present | 165 |
| 21 | 15 | Absent | 1220 | 250 | 0.3 | 1230 | 0.6 | 186 | Mainly B | 55 | 103 | Present | 55 |
| 22 | 16 | Present | 1220 | 250 | 0.3 | 1230 | 0.6 | 352 | Mainly B | 87 | 54 | Present | 321 |
| 23 | 17 | Present | 1220 | 250 | 0.3 | 1230 | 0.6 | 318 | Mainly B | 90 | 60 | Present | 320 |
| 24 | 18 | Absent | 1220 | 250 | 0.3 | 1230 | 0.6 | 359 | F + P + B | 48 | 115 | Present | 125 |
| 25 | 19 | Present | 1220 | 250 | 0.3 | 1230 | 0.6 | 333 | Mainly B | 98 | 35 | Present | 450 |
| 26 | 20 | Present | 1220 | 250 | 0.3 | 1230 | 0.6 | 278 | Mainly B | 97 | 44 | Present | 380 |
| 27 | 21 | Present | 1220 | 250 | 0.3 | 1230 | 0.6 | 264 | Mainly B | 90 | 55 | Present | 345 |
| 28 | 22 | Present | 1220 | 250 | 0.3 | 1230 | 0.6 | 275 | F + P + B | 24 | 124 | Present | 150 |
| 29 | 23 | Present | 1220 | 250 | 0.3 | 1230 | 0.6 | 320 | M + B | 55 | 25 | Present | 425 |
| 30 | 24 | Absent | 1220 | 250 | 0.3 | 1230 | 0.6 | 245 | F + P + B | 40 | 75 | Present | 280 |
| 31 | 25 | Absent | 1220 | 250 | 0.3 | 1230 | 0.6 | 270 | Mainly B | 96 | 38 | Present | 420 |
| 32 | 26 | Absent | 1220 | 250 | 0.3 | 1230 | 0.6 | 285 | Mainly B | 93 | 116 | Present | 395 |
| 33 | 27 | Present | 1220 | 250 | 0.3 | 1230 | 0.6 | 310 | Mainly B | 92 | 30 | Present | 510 |
| 34 | 28 | Absent | 1220 | 250 | 0.3 | 1230 | 0.6 | 210 | Mainly B | 88 | 85 | Present | 190 |
| 35 | 29 | Present | 1220 | 250 | 0.3 | 1230 | 0.6 | 289 | Mainly B | 98 | 43 | Present | 425 |
| 36 | 30 | Absent | 1220 | 250 | 0.3 | 1230 | 0.6 | 275 | Mainly B | 94 | 111 | Present | 375 |
| 37 | 31 | Present | 1220 | 250 | 0.3 | 1230 | 0.6 | 265 | Mainly B | 93 | 85 | Present | 280 |
| 38 | 32 | Absent | 1220 | 250 | 0.3 | 1230 | 0.6 | 270 | Mainly B | 96 | 156 | Present | 215 |
| 39 | 33 | Present | 1220 | 250 | 0.3 | 1230 | 0.6 | 275 | Mainly B | 91 | 100 | Present | 350 |
| 40 | 34 | Present | 1220 | 250 | 0.3 | 1230 | 0.6 | 296 | Mainly B | 90 | 54 | Present | 445 |
| 41 | 35 | Absent | 1220 | 250 | 0.3 | 1230 | 0.6 | 267 | Mainly B | 93 | 117 | Present | 520 |
| 42 | 36 | Present | 1220 | 250 | 0.3 | 1230 | 0.6 | 245 | Mainly B | 92 | 35 | Present | 475 |
| 43 | 37 | Absent | 1220 | 250 | 0.3 | 1230 | 0.6 | 265 | Mainly B | 95 | 119 | Present | 354 |
| 44 | 38 | Absent | 1220 | 250 | 0.3 | 1230 | 0.6 | 295 | Mainly B | 94 | 134 | Present | 423 |
| 45 | 39 | Present | 1220 | 250 | 0.3 | 1230 | 0.6 | 279 | Mainly B | 96 | 53 | Present | 386 |
| 46 | 40 | Absent | 1220 | 250 | 0.3 | 1230 | 0.6 | 218 | F + P | — | 85 | Absent | — |

| No. | Steel properties (before nitrocarburizing treatment) Tool life (s) | Nitrocarburizing treatment temperature (° C.) | Surface hardness HV | Hardened case depth (mm) | Core hardness HV | Steel microstructure | Bainite phase area ratio (%) | Dispersion state of Ti carbonitrides (number/μm²) | Heat treatment distortion property | Remarks |
|---|---|---|---|---|---|---|---|---|---|---|
| 1 | 630 | 570 | 832 | 0.17 | 260 | Mainly B | 94 | 556 | I | Ex. |
| 2 | 510 | 575 | 829 | 0.16 | 309 | Mainly B | 99 | 445 | I | Ex. |
| 3 | 471 | 600 | 843 | 0.20 | 323 | Mainly B | 98 | 352 | I | Ex. |
| 4 | 559 | 585 | 848 | 0.21 | 299 | Mainly B | 93 | 540 | I | Ex. |
| 5 | 563 | 590 | 839 | 0.20 | 295 | Mainly B | 97 | 423 | I | Ex. |
| 6 | 550 | 575 | 831 | 0.18 | 298 | Mainly B | 98 | 502 | I | Ex. |
| 7 | 564 | 570 | 835 | 0.19 | 301 | Mainly B | 96 | 465 | I | Ex. |
| 8 | 552 | 565 | 833 | 0.16 | 302 | Mainly B | 95 | 356 | I | Ex. |
| 9 | 632 | 580 | 836 | 0.15 | 253 | Mainly B | 54 | 321 | I | Ex. |
| 10 | 534 | 595 | 839 | 0.18 | 307 | Mainly B | 96 | 569 | I | Ex. |

TABLE 2-continued

| | | | | | | | | | | |
|---|---|---|---|---|---|---|---|---|---|---|
| 11 | 561 | 570 | 860 | 0.20 | 296 | Mainly B | 58 | 333 | I | Ex. |
| 12 | 570 | 570 | 843 | 0.19 | 285 | Mainly B | 100 | 405 | I | Ex. |
| 13 | 555 | 565 | 837 | 0.17 | 293 | Mainly B | 99 | 336 | I | Ex. |
| 14 | 512 | 560 | 828 | 0.18 | 298 | Mainly B | 97 | 310 | I | Ex. |
| 15 | 405 | 565 | 802 | 0.19 | 270 | Mainly B | <u>80</u> | <u>95</u> | II | Comp. Ex. |
| 16 | 309 | 570 | 805 | 0.18 | 203 | F + P + B | <u>22</u> | <u>285</u> | III | Comp. Ex. |
| 17 | 396 | 570 | 786 | 0.19 | 202 | F + P + B | <u>13</u> | <u>196</u> | II | Comp. Ex. |
| 18 | 354 | 570 | 794 | 0.20 | 220 | Mainly B | 90 | 480 | III | Comp. Ex. |
| 19 | 570 | 570 | 804 | 0.22 | 560 | Mainly B | 90 | 303 | I | Ex. |
| 20 | 136 | 570 | 817 | 0.19 | 213 | F + P + B | <u>42</u> | <u>123</u> | III | Comp. Ex. |
| 21 | 412 | 580 | 828 | 0.18 | 170 | F + P + B | 54 | <u>45</u> | III | Comp. Ex. |
| 22 | 220 | 580 | 842 | 0.23 | 342 | Mainly B | 85 | 290 | I | Comp. Ex. |
| 23 | 133 | 580 | 804 | 0.18 | 308 | Mainly B | <u>90</u> | 255 | II | Comp. Ex. |
| 24 | 224 | 580 | 819 | 0.26 | 366 | F + P + B | 45 | <u>136</u> | III | Comp. Ex. |
| 25 | 95 | 580 | 821 | 0.19 | 313 | Mainly B | 94 | 405 | I | Comp. Ex. |
| 26 | 316 | 575 | 830 | 0.20 | 265 | Mainly B | 96 | 390 | I | Comp. Ex. |
| 27 | 613 | 575 | 810 | 0.17 | 259 | Mainly B | 89 | 340 | I | Comp. Ex. |
| 28 | 245 | 575 | 795 | 0.20 | 250 | F + P + B | <u>26</u> | <u>123</u> | II | Comp. Ex. |
| 29 | 85 | 570 | 808 | 0.25 | 315 | Tempered M + B | <u>45</u> | 426 | III | Comp. Ex. |
| 30 | 315 | 575 | 820 | 0.15 | 240 | F + P + B | 35 | 210 | II | Comp. Ex. |
| 31 | 222 | 570 | 826 | 0.18 | 265 | Mainly B | 96 | 410 | II | Comp. Ex. |
| 32 | 505 | 575 | 750 | 0.17 | 280 | Mainly B | 90 | 370 | III | Comp. Ex. |
| 33 | 253 | 570 | 826 | 0.18 | 292 | Mainly B | 90 | 480 | III | Comp. Ex. |
| 34 | 495 | 565 | 780 | 0.18 | 195 | Mainly B | 80 | 185 | I | Comp. Ex. |
| 35 | 360 | 580 | 815 | 0.20 | 285 | Mainly B | 95 | 410 | II | Comp. Ex. |
| 36 | 515 | 570 | 790 | 0.18 | 270 | Mainly B | 94 | 360 | III | Comp. Ex. |
| 37 | 456 | 570 | 830 | 0.14 | 262 | Mainly B | 93 | 301 | I | Comp. Ex. |
| 38 | 520 | 565 | 795 | 0.15 | 260 | Mainly B | 95 | <u>201</u> | III | Comp. Ex. |
| 39 | 410 | 565 | 832 | 0.17 | 269 | Mainly B | 90 | 340 | II | Comp. Ex. |
| 40 | 430 | 560 | 815 | 0.18 | 290 | Mainly B | 90 | 440 | I | Comp. Ex. |
| 41 | 421 | 550 | 789 | 0.21 | 253 | Mainly B | 95 | <u>256</u> | II | Comp. Ex. |
| 42 | 525 | 570 | 805 | 0.20 | 235 | Mainly B | 90 | 450 | I | Comp. Ex. |
| 43 | 513 | 580 | 796 | 0.19 | 260 | Mainly B | 93 | 336 | III | Comp. Ex. |
| 44 | 413 | 570 | 806 | 0.18 | 285 | Mainly B | 92 | 408 | III | Comp. Ex. |
| 45 | 551 | 570 | 837 | 0.17 | 299 | Mainly B | 96 | 397 | I | Comp. Ex. |
| 46 | 265 | —*3 | 745 | 1.04 | 341 | Tempered M | 48 | — | III | Conv. Ex. |

*1 Underlines indicate outside application range.
*2 Symbols for microstructure represent the following phases: F: ferrite, P: pearlite, B: bainite, M: martensite.
*3 Carburizing treatment was performed.
*4 Surface defect after hot rolling
*5 Heat treatment distortion property I: opening ratio of 0% to 1%, II: opening ratio of more than 1% and 2% or less, III: opening ratio of more than 2%.

The invention claimed is:

1. A method of producing a steel for nitrocarburizing, the method comprising:
subjecting a steel material to first hot working of working at a heating temperature of 1200° C. or more and then cooling to 400° C. or less at a cooling rate in a temperature range of 650° C. to 400° C. of 0.2° C./s or more and 0.3° C./s or less; and
thereafter subjecting the steel material to second hot working of working at a heating temperature of 1200° C. or more and then cooling at a cooling rate in a temperature range of 700° C. to 550° C. of 0.4° C./s or more,
wherein the steel material has a chemical composition containing, in mass %,
C: 0.02% or more and less than 0.15%,
Si: 0.30% or less,
Mn: 1.5% or more and 2.5% or less,
P: 0.025% or less,
S: 0.06% or less,
Cr: 0.5% or more and 2.0% or less,
Mo: 0.005% or more and 0.2% or less,
V: 0.02% or more and 0.20% or less,
Nb: 0.003% or more and 0.20% or less,
Al: more than 0.020% and 1.0% or less,
Ti: more than 0.0050% and 0.015% or less,
N: 0.0200% or less, and
Sb: 0.0030% or more and 0.010% or less,
with a balance being Fe and inevitable impurities,
satisfying any of the following Expressions (1) and (2):

in the case where the C content is 0.02% or more and 0.10% or less, $$1.4 \leq A \leq 3.2 \quad (1)$$

where $A=1000 \times \{7 \times (Ti/48)+17 \times (Sb/122)\}$; and
in the case where the C content is more than 0.10% and less than 0.15%, $$0.9 \leq A \leq 2.3 \quad (2)$$

where $A=850 \times \{5 \times (Ti/48)+13 \times (Sb/122)\}$.

2. The method of producing a steel for nitrocarburizing according to claim 1, wherein the chemical composition further contains, in mass %, at least one group selected from the following (A) to (C);
(A) one or more selected from the group consisting of
B: 0.010% or less,
Cu: 0.30% or less, and
Ni: 0.30% or less;
(B) one or more selected from the group consisting of
Co: 0.2% or less,
Zr: 0.2% or less,
Hf: 0.3% or less,
Ta: 0.3% or less, and
W: 0.4% or less;
(C) one or more selected from the group consisting of
Pb: 0.2% or less,
Bi: 0.2% or less,
Zn: 0.3% or less, and
Sn: 0.3% or less.

3. A method of producing a nitrocarburized component, the method comprising
subjecting a steel for nitrocarburizing obtained by the method according to claim 2, to nitrocarburizing treatment at a temperature of 550° C. to 600° C. for 30 min or more.

4. A method of producing a nitrocarburized component, the method comprising
subjecting a steel for nitrocarburizing obtained by the method according to claim 1, to nitrocarburizing treatment at a temperature of 550° C. to 600° C. for 30 min or more.

\* \* \* \* \*